US012606486B2

(12) United States Patent
Langham, III et al.

(10) Patent No.: US 12,606,486 B2
(45) Date of Patent: Apr. 21, 2026

(54) HIGH STRENGTH CONCRETE ADMIXTURE

(71) Applicant: The Euclid Chemical Company,
Cleveland, OH (US)

(72) Inventors: John D. Langham, III, Painesville, OH
(US); Benjamin Veres, Willowick, OH
(US)

(73) Assignee: The Euclid Chemical Company,
Cleveland, OH (US)

( * ) Notice: Subject to any disclaimer, the term of this
patent is extended or adjusted under 35
U.S.C. 154(b) by 489 days.

(21) Appl. No.: 18/156,099

(22) Filed: Jan. 18, 2023

(65) Prior Publication Data

US 2023/0227358 A1 Jul. 20, 2023

Related U.S. Application Data

(60) Provisional application No. 63/300,475, filed on Jan.
18, 2022.

(51) Int. Cl.
C04B 24/04 (2006.01)
C04B 22/08 (2006.01)
(Continued)

(52) U.S. Cl.
CPC ............ C04B 24/04 (2013.01); C04B 22/085
(2013.01); C04B 22/141 (2013.01);
(Continued)

(58) Field of Classification Search
CPC ..... C04B 24/04; C04B 22/085; C04B 22/141;
C04B 24/121; C04B 24/16; C04B 24/2664; C04B 2103/12; C04B 2103/14;
C04B 2103/22; C04B 2103/302; C04B
28/04; C04B 40/0042; C04B 2201/05;
C04B 24/06; C04B 24/12; C04B 24/122;
C04B 14/06; C04B 2103/32
See application file for complete search history.

(56) References Cited

U.S. PATENT DOCUMENTS 6,767,399 B2 7/2004 Peev et al.
6,800,129 B2 10/2004 Jardine et al.
(Continued)

FOREIGN PATENT DOCUMENTS

EP 670292 A1 9/1995
EP 1404627 A1 4/2004
(Continued)

OTHER PUBLICATIONS

JP4150134B2 Translation (Year: 2008).*
JP45500371B2 Translation (Year: 2010).*

*Primary Examiner* — Pamela H Weiss
(74) *Attorney, Agent, or Firm* — Calfee, Halter &
Griswold LLP

(57) ABSTRACT

A strengthening concrete admixture for the production of
high-strength concrete products is provided. The strength-
ening concrete admixture comprises water; a set retarder
comprising a salt of gluconic acid; one or more set accel-
erators; one or more hardening accelerators; and at least one
stabilizing agent. Incorporation of the strengthening admix-
ture in a cement mixture enhances both early and late age
strength development and allows for sustainable and more
energy efficient construction practices.

20 Claims, 3 Drawing Sheets

(51) Int. Cl.

| | | |
|---|---|---|
| *C04B 22/14* | (2006.01) |
| *C04B 24/12* | (2006.01) |
| *C04B 24/16* | (2006.01) |
| *C04B 24/26* | (2006.01) |
| *C04B 103/12* | (2006.01) |
| *C04B 103/14* | (2006.01) |
| *C04B 103/22* | (2006.01) |
| *C04B 103/30* | (2006.01) |

(52) U.S. Cl.

CPC ............ *C04B 24/121* (2013.01); *C04B 24/16* (2013.01); *C04B 24/2664* (2013.01); *C04B 2103/12* (2013.01); *C04B 2103/14* (2013.01); *C04B 2103/22* (2013.01); *C04B 2103/302* (2013.01)

(56) References Cited

U.S. PATENT DOCUMENTS

| | | | |
|---|---|---|---|
| 6,858,074 B2 | 2/2005 | Anderson et al. |
| 7,497,904 B2 | 3/2009 | Dulzer et al. |
| 7,556,684 B2 | 7/2009 | Bury et al. |

| | | | | |
|---|---|---|---|---|
| 7,972,435 | B2 | 7/2011 | Bury et al. | |
| 8,258,210 | B2 * | 9/2012 | Bury | C04B 28/02 |
| | | | | 106/725 |
| 8,361,220 | B2 | 1/2013 | Bury et al. | |
| 2003/0172850 | A1 * | 9/2003 | Chun | C04B 40/0039 |
| | | | | 106/725 |
| 2009/0200029 | A1 * | 8/2009 | Roddy | C09K 8/467 |
| | | | | 106/707 |
| 2015/0144033 | A1 * | 5/2015 | Schaef | C04B 40/0039 |
| | | | | 106/809 |
| 2016/0107938 | A1 * | 4/2016 | Mäder | C04B 28/04 |
| | | | | 106/713 |
| 2016/0176758 | A1 * | 6/2016 | Müller | C04B 28/02 |
| | | | | 106/808 |
| 2020/0055775 | A1 * | 2/2020 | Silva | C04B 24/122 |

FOREIGN PATENT DOCUMENTS

| | | | | |
|---|---|---|---|---|
| EP | 1603846 A2 | 12/2005 | | |
| EP | 3019455 A1 | 5/2016 | | |
| JP | 4150134 B2 * | 9/2008 | | |
| JP | 4500371 B2 * | 7/2010 | ......... | C04B 40/0633 |
| WO | 2021204942 A1 | 10/2021 | | |

* cited by examiner

HIGH STRENGTH CONCRETE ADMIXTURE

CROSS-REFERENCE TO RELATED APPLICATIONS

This application claims priority to and all benefit of U.S. Provisional Patent Application No. 63/300,475, filed on Jan. 18, 2022, the entire disclosure of which is fully incorporated herein by reference.

BACKGROUND

Concrete is one of the most commonly used construction materials for a variety of reasons, as it costs much less than other construction materials and is easy to work with. Concrete is a composite material including a mineral-based hydraulic binder (cement) which acts to adhere mineral particulates together in a solid mass. Concrete can optionally include other supplementary cementitious materials, inert fillers, property modifying chemical admixtures, coloring agents, and other additives, depending on the desired properties.

As efforts to reduce greenhouse gas emissions, such as $CO_2$, have increased worldwide, solutions to reduce the emissions of $CO_2$ associated with the manufacturing of cement has become in increased demand. Although there are a number of methods and technologies for providing more environmentally friendly solutions, there remains a need for a concrete mixture that is capable of reducing the amount of cement, and thus the overall $CO_2$ production emissions, while maintaining and even enhancing both early and late age strength development.

SUMMARY

The general inventive concepts are directed to a strengthening concrete admixture for the production of high-strength cementitious systems. The strengthening concrete admixture comprises water; 1 wt. % to 15 wt. % of a set retarder comprising a salt of gluconic acid; one or more set accelerators comprising an inorganic salt, a salt of thiocyanic acid, or mixtures thereof, 0.5 wt. % to 25 wt. % of one or more hardening accelerators; and 0.1 wt. % to 10 wt. % of at least one stabilizing agent, based on a total solids content in the strengthening concrete admixture.

In any of the exemplary embodiments, the set accelerator may comprise each of an inorganic salt and a salt or ester of thiocyanic acid. If present, some embodiments of the strengthening admixture may include the inorganic salt in an amount between 25 wt. % and 55 wt. %, based on a total solids content of the strengthening admixture.

In any of the exemplary embodiments, the strengthening concrete admixture may comprise one or more of sodium thiocyanate, potassium thiocyanate, magnesium thiocyanate, calcium thiocyanate, and ammonium thiocyanate, with the salt of thiocyanic acid being present in the admixture in an amount between 10 wt. % and 30 wt. %, based on a total solids content of the strengthening admixture.

The set accelerator may comprise one or more alkanolamines and one or more ethylene amines, with the one or more alkanolamines including triethanolamine, diethanolamine, and mixtures thereof. In the embodiments including triethanolamine, such is included in the strengthening admixture in an amount between 1 wt. % and 10 wt. %, based on a total solids content of the strengthening admixture. In the embodiments including diethanolamine, the diethanolamine is included in the strengthening admixture in an amount between 3.5 wt. % and 20 wt. %, based on a total solids content of the strengthening admixture.

In any of the embodiments herein, the strengthening admixture may comprise or consist of. 2.0-10 wt. % sodium gluconate; 30-50 wt. % calcium nitrate; 10-30 wt. % sodium thiocyanate; 1-10 wt. % triethanolamine; 3.5-20 wt. % diethanolamine/triethanolamine blend; 8-25 wt. % tetrahydroxyethyl ethylene diamine; and 1 to 8 wt. % acetic acid.

Further aspects of the general inventive concepts are directed to a concrete mixture comprising cement; aggregate: and 3.5 oz/100 lbs. cement to 24 oz/100 lbs. cement of a strengthening admixture comprising water; 1 wt. % to 15 wt. % of a set retarder comprising a salt of gluconic acid; one or more set accelerators comprising an inorganic salt, a salt of thiocyanic acid, or mixtures thereof, 0.5 wt. % to 25 wt. % of one or more hardening accelerators; and 0.1 wt. % to 10 wt. % of at least one stabilizing agent, based on a total solids content in the strengthening concrete admixture. In any of the exemplary embodiments, the strengthening admixture may be present in the concrete mixture in an amount from about from 5 oz/100 lbs. cement to about 15 oz/100 lbs. of cement. In any of the exemplary embodiments, the concrete mixture may further include a polycarboxylate-based high range water reducer admixture.

DESCRIPTION OF THE FIGURES

The advantages of the inventive concepts will be apparent upon consideration of the following detailed disclosure, especially when taken in conjunction with the accompanying drawings wherein.

DETAILED DESCRIPTION

Figure 1:
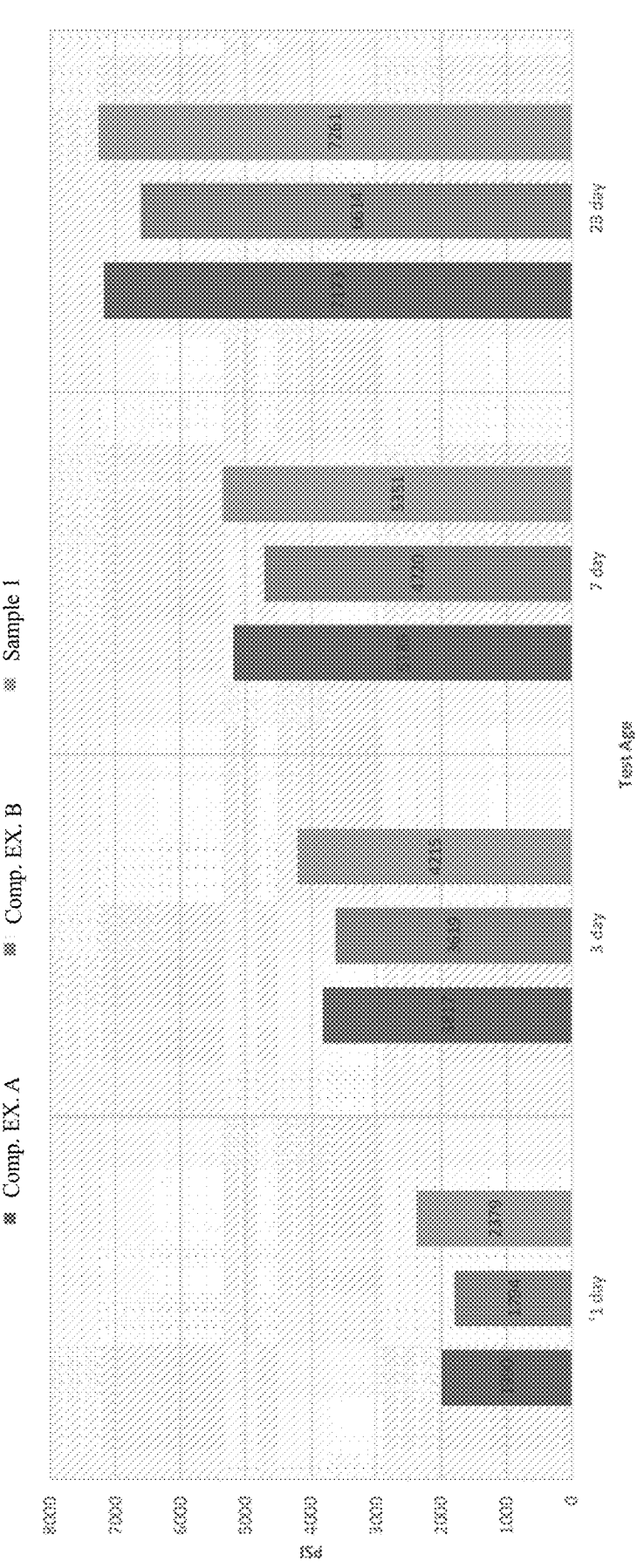
FIG. 1 graphically illustrates the compressive strength of concrete samples made with various types of cement and the impact of including 10 oz/CWT of the strengthening concrete admixture disclosed herein.

The general inventive concepts are directed to an admixture for the production of concrete products with enhanced strength and produced with reduced $CO_2$ emissions and overall energy consumption. Concrete products may include, for example, concrete block, concrete brick, cast-in-place concrete, precast concrete, high performance concrete, ultra-high-performance concrete (UHPC), self-consolidating concrete (SCC), and other concrete building structures.

Concrete products are generally produced from combining Portland cement or Portland limestone cement, coarse and/or fine aggregates (i.e., limestone, sand, and gravel), and water. Optional ingredients may include supplementary cementitious materials such as fly ash, granulated blast-furnace slag, silica fume, or other waste stream by-products. For decorative applications, integral colors and/or pigments may also be included.

Various additives and admixtures may be incorporated into concrete mixtures to impart certain characteristics not otherwise obtainable with plain concrete mixes. Chemical admixtures may be dispensed directly into concrete mixtures during the batching and mixing processes, altering the fresh and/or hardened properties in a wide variety of ways. Such admixtures may include accelerators to speed up hydration (hardening of the concrete), retarding (slowing of hydration), plasticizers, pigments, corrosion inhibitors, bonding agents, air entrainers, and the like.

The present exemplary embodiments are directed to a novel admixture composition for concrete products that facilitates cement hydration, enhances strength development, and allows for the reduction in overall cement content. Reducing the amount of cementitious material in concrete reduces the overall $CO_2$ emissions and provides a total embodied energy reduction. The manufacture of cement produces about 0.9 lbs. of $CO_2$ for every pound of cement. Thus, efforts to reduce $CO_2$ emissions may be met by decreasing the amount of cement in concrete materials. However, as the amount of cement in concrete mixtures must generally be increased in order to meet concrete specification requirements, it was surprisingly discovered that inclusion of at least about 2 oz/100 lbs. cement of the strengthening admixture disclosed herein allows for the reduction of the amount of cement in a concrete mixture, while at a minimum maintaining, and in some instances exceeding the compressive strength of a cement mixture without inclusion of the admixture.

The strengthening admixture comprises a novel mixture of water, at least one set retarder, one or more set accelerators, one or more hardening accelerators, and at least one stabilizing agent. The strengthening admixture comprises a particular combination and concentration of ingredients that provide surprisingly improved early and late age strength development, even with a reduction in cement content.

In any of the exemplary embodiments disclosed herein, the set retarder may comprise, for example, a salt of gluconic acid, glucose, sucrose, tartaric acid, fumaric acid, phosphonic acid, and the like. Exemplary salts of gluconic acid include a sodium salt or sodium gluconate. In some exemplary embodiments, the set retarder comprises sodium gluconate with residual gluconic acid. The set retarder works to balance the effects of one or more of the set accelerators, described in more detail below. The set retarder also helps stabilize the formulation and neutralize the amines, also described in more detail below.

The set retarder may be included in the strengthening admixture in an amount from at least 0.5 wt. %, including in an amount of at least 0.75 wt. %, at least 1 wt. %, at least 1.5 wt. %, at least 1.7 wt. %, at least 2 wt. %, at least 2.5 wt. %, at least 2.7 wt. %, at least 3 wt. %, at least 3.3 wt. %, at least 3.5 wt. %, at least 3.7 wt. %, at least 4 wt. %, at least 4.3 wt. %, at least 4.5 wt. %, at least 4.7 wt. %, at least 5 wt. %, and at least 5.5 wt. %, based on the total solids of the strengthening admixture (also referred to at weight percent solids). Likewise, the set retarder may be included in an amount no greater than 15 wt. %, including an amount no greater than 12 wt. %, no greater than 10 wt. %, no greater than 8 wt. %, no greater than 7.5 wt. %, no greater than 7 wt. %, no greater than 6.7 wt. %, no greater than 6.5 wt. %, no greater than 6.3 wt. %, and no greater than 6 wt. %. In any of the exemplary embodiments, the set retarder is present in the strengthening concrete admixture in an amount between about 1 wt. % to about 15 wt. %, including between about 1.5 wt. % and about 12 wt. %, between about 2 wt. % and about 10 wt. %, between about 2.2 wt. % and 8 wt. %, between about 2.5 wt. % and about 7.5 wt. %, between about 2.8 wt. % and 7 wt. %, and between about 3 wt. % and about 6.5 wt. %, based on the total solids of the strengthening concrete admixture, including all endpoints and ranges therebetween.

In any of the exemplary embodiments, the strengthening admixture further includes a set accelerator, comprising one or more of an inorganic salt, a salt or ester of thiocyanic acid, or mixtures thereof. In some exemplary embodiments, the set accelerator comprises both an inorganic salt and a salt of thiocyanic acid. The inorganic salt may comprise a nitrate, such as a calcium nitrate and/or sodium nitrate. In addition to functioning as a set accelerator, the inorganic salt acts as a plasticizer, and a long-term strength enhancer. In any of the exemplary embodiments, the set accelerator may comprise sodium thiocyanate.

The inorganic salt may be included in the strengthening admixture in at least 5 wt. %, including at least 8 wt. %, at least 10 wt. %, at least 12 wt. %, at least 15 wt. %, at least 18 wt. %, at least 20 wt. %, at least 22 wt. %, at least 24 wt. %, at least 26 wt. %, at least 28 wt. %, at least 30 wt. %, and at least 32 wt. %, based on the total solids of the strengthening concrete admixture. Likewise, in any of the exemplary embodiments, the inorganic salt may be included in an amount no greater than 70 wt. %, including an amount no greater than 65 wt. %, no greater than 60 wt. %, no greater than 57 wt. %, no greater than 55 wt. %, no greater than 52 wt. %, no greater than 50 wt. %, no greater than 47 wt. %, no greater than 45 wt. %, no greater than 42 wt. %., and no greater than 40 wt. %, based on the total solids of the strengthening concrete admixture. In any of the exemplary embodiments, the inorganic salt may be present in the strengthening concrete admixture in an amount between about 8 wt. % to about 65 wt. %, including between about 10 wt. % and about 60 wt. %, between about 12 wt. % and about 55 wt. %, between about 15 wt. % and 50 wt. %, between about 18 wt. % and 45 wt. %, between about 20 wt. % and 42 wt. %, between about 21 wt. % and about 40 wt. %, and between about 20 wt. % and 38 wt. %. based on the total solids of the strengthening concrete admixture, including all endpoints and ranges therebetween.

The salts of the thiocyanic acid (also known as thiocyanate salts) have the general formula M(SCN)b, where M is an alkali metal, or an alkaline earth metal or aluminum, and where b is 1 for alkali metal salts, 2 for alkaline earth salts, and 3 for aluminum salts. In some exemplary embodiments, the thiocyanate salt is one of Na, K, Mg, Ca and Al. In these or other exemplary embodiments, the thiocyanate salt may comprise one or more of a sodium, potassium, and/or ammonium thiocyanate. The thiocyanate salt functions as a set accelerator and also increases the strength of cement. Thiocyanate salts are effective in increasing strengths and allowing for early stripping times in precast applications.

The thiocyanate salt may be included in the strengthening admixture in at least 1 wt. %, including at least 4 wt. %, at least 8 wt. %, at least 10 wt. %, at least 12 wt. %, at least 14 wt. %, at least 14.5 wt. %, at least 15 wt. %, at least 15.5 wt. %, at least 16 wt. %, and at least 15.5 wt. %, based on the total solids of the strengthening admixture. Likewise, in any of the exemplary embodiments, the thiocyanate salt may be included in an amount no greater than 50 wt. %, including an amount no greater than 45 wt. %, no greater than 40 wt. %, no greater than 38 wt. %, no greater than 36 wt. %, no greater than 34 wt. %, no greater than 32 wt. %, no greater than 30 wt. %, no greater than 27 wt. %, no greater than 25 wt. %., no greater than 22 wt. %, no greater than 20 wt. %, and no greater than 18 wt. %, based on the total solids of the strengthening admixture. In any of the exemplary embodiments, the thiocyanate salt may be present in the strengthening admixture in an amount between about 3 wt. % to about 35 wt. %, including between about 5 wt. % and about 30 wt. %, between about 8 wt. % and about 28 wt. %, between about 10 wt. % and 26 wt. %, between about 12 wt. % and 24 wt. %, and between about 15 wt. % and 22 wt. %, based on the total solids of the strengthening admixture, including all endpoints and ranges therebetween.

The strengthening admixture may further comprise one or more hardening accelerators, which increase the early strength of concrete. The strengthening admixture may include one or more distinct hardening accelerators which work in synergy to increase the strength of the concrete, while not negatively impacting the workability. Exemplary hardening accelerators include one or more alkanolamines, such may comprise any of a mono-, di-, or tri-alkanolamines, or mixtures thereof, and ethylene amines. In any of the exemplary embodiments, the hardening accelerator may comprise at least one di-alkanolamine, such as di-ethanolamine, and at least one triethanolamine. The diethanolamine may be present alone or as a mixture of diethanolamine and triethanolamine (referred to herein as a DEA-TEA blend).

If present, the triethanolamine may be included in the strengthening admixture in at least 0.5 wt. %, including at least 0.8 wt. %, at least 1 wt. %, at least 1.5 wt. %, at least 1.7 wt. %, at least 2 wt. %, at least 2.5 wt. %, at least 2.8 %, at least 3 wt. %, at least 3.2 wt. %, at least 3.5 wt. %, at least 3.7 wt. %, at least 4 wt. %, at least 4.3 wt. %, at least 4.5 wt. %, at least 4.7 wt. %, and at least 5 wt. %, based on the total solids of the strengthening admixture. Likewise, in any of the exemplary embodiments, the triethanolamine may be included in an amount no greater than 15 wt. %, including an amount no greater than 12 wt. %, no greater than 10 wt. %, no greater than 8 wt. %, no greater than 7.5 wt. %, no greater than 7.2 wt. %, no greater than 7 wt. %, no greater than 6.5 wt. %, no greater than 6 wt. %, no greater than 5.8 wt. %., no greater than 5.5 wt. %, and no greater than 5 wt. %, based on the total solids of the strengthening admixture. In any of the exemplary embodiments, the triethanolamine may be present in the strengthening admixture in an amount between about 0 wt. % to about 10 wt. %, including between about 0.8 wt. % and about 8.5 wt. %, between about 1 wt. % and about 7.5 wt. %, between about 1.5 wt. % and 7 wt. %, between about 1.7 wt. % and 6.8 wt. %, between about 2 wt. % and 6.5 wt. %, between about 2.3 wt. % and about 6.3 wt. %, between about 2.5 wt. % and about 6 wt. %, between about 2.7 wt. % and about 5.8 wt. %, and between about 3 wt. % and 5.5 wt. %. based on the total solids of the strengthening admixture, including all endpoints and ranges therebetween.

If included, the di-alkanolamine or DEA-TEA blend may be included in the strengthening admixture in at least 0.5 wt. %, including at least 1 wt. %, at least 1.5 wt. %, at least 2 wt. %, at least 2.5 wt. %, at least 3 wt. %, at least 3.5 wt. %, at least 4 wt. %, at least 4.5 wt. %, at least 5 wt. %, at least 5.5 wt. %, at least 6 wt. %, at least 6.5 wt. %, at least 6.5 wt. %, at least 7 wt. %, at least 7.5 wt. %, at least 8 wt. %, at least 8.5 wt. %, at least 9 wt. %, at least 9.5 wt. %, and at least 10 wt. %, based on the total solids of the strengthening admixture. Likewise, in any of the exemplary embodiments, the di-alkanolamine or DEA-TEA blend may be included in an amount no greater than 25 wt. %, including an amount no greater than 23.5 wt. %, no greater than 23 wt. %, no greater than 20.5 wt. %, no greater than 20 wt. %, no greater than 18.8 wt. %, no greater than 18.5 wt. %, no greater than 18.3 wt. %, no greater than 18 wt. %, and no greater than 17.5 wt. %, based on the total solids of the strengthening admixture. In any of the exemplary embodiments, the di-alkanolamine or DEA-TEA blend may be present in the strengthening admixture in an amount between 0 and about 25 wt. %, including between about 0.5 wt. % and about 18.5 wt. %, between about 1 wt. % and about 15 wt. %, between about 1.5 wt. % and 13 wt. %, between about 2 wt. % and 12.5 wt. %, between about 2.5 wt. % and 12.3 wt. %, between about 3 wt. % and about 12 wt. %, between about 3.5 wt. % and about 11.7 wt. %, between about 3.7 wt. % and about 11.5 wt. %, and between about 4 wt. % and 11 wt. %. based on the total solids of the strengthening admixture, including all endpoints and ranges therebetween.

Alternatively, or in addition to the hardening accelerators disclosed above, the strengthening admixture may further comprise one or more ethylene amines, such as, for example, an ethoxylate of ethylenediamine, such as tetrahyroxyethyl ethylene diamine (THEED), diethylene triamine, tetraethylene pentaamine, and triethylene tetramine. In addition to functioning as a hardening accelerator, the ethylene amine works to improve late state strength development.

If present, the ethylene amine may be included in the strengthening admixture in at least 4 wt. %, including at least 5 wt. %, at least 7 wt. %, at least 8.5 wt. %, at least 9 wt. %, at least 9.5 wt. %, at least 10 wt. %, at least 10.5 wt. %, at least 11 wt. %, at least 11.5 wt. %, at least 12 wt. %, at least 12.5 wt. %, at least 13 wt. %, at least 13.5 wt. %, at least 14 wt. %, at least 14.5 wt. %, at least 15 wt. %, at least 15.5 wt. %, at least 16 wt. %, and at least 16.5 wt. %, based on the total solids of the strengthening admixture. Likewise, in any of the exemplary embodiments, the ethylene amine may be included in an amount no greater than 30 wt. %, including an amount no greater than 25.5 wt. %, no greater than 25 wt. %, no greater than 22.5 wt. %, no greater than 22 wt. %, no greater than 20.5 wt. %, no greater than 20 wt. %, no greater than 19.5 wt. %, no greater than 19 wt. %, and no greater than 18.8 wt. %, based on the total solids of the strengthening admixture. In any of the exemplary embodiments, the ethylene amine may be present in the strengthening admixture in an amount between about 0 wt. % to about 30 wt. %, including between about 2.5 wt. % and about 25.5 wt. %, between about 4.0 wt. % and about 25 wt. %, between about 5.0 wt. % and 23.5 wt. %, between about 5.5 wt. % and 23 wt. %, between about 7.0 wt. % and 22.5 wt. %, between about 8 wt. % and about 22 wt. %, between about 8.5 wt. % and about 20.5 wt. %, between about 9 wt. % and about 20 wt. %, and between about 9.5 wt. % and 19.5 wt. %. based on the total solids of the strengthening admixture, including all endpoints and ranges therebetween.

In any of the exemplary embodiments disclosed herein, the strengthening admixture may further comprise one or more stabilizing agent and/or finishing aid. The stabilizing agent may also help buffer the pH of the strengthening admixture and prevent separation. The stabilizing agent may be any material capable of stabilizing the concrete mixture. Exemplary stabilizing agents include, for example, carboxylic acids, such as acetic acid, formic acid, propionic acid, citric acid, lauric acid, undecylenic acid, myristic acid, stearic acid, and the like. In any of the exemplary embodiments, the carboxylic acid may be acetic acid. Alternative stabilizing agents may include organic and synthetic polymers, water-swellable polymers, hydroxyethyl cellulose (HEC) or (HEC) blended with dispersants, organic flocculants, organic emulsions of paraffin, coal tar, asphalt, acrylics, bentonite and pyrogenic silicas, natural pozzolans, fly ash and hydrated lime.

The stabilizing agent may be included in the strengthening admixture in at least 0.01 wt. %, including at least 0.05 wt. %, at least 0.1 wt. %, at least 0.5 wt. %, at least 0.8 wt.

%, at least 1 wt. %, at least 1.25 wt. %, at least 1.5 wt. %, at least 2 wt. %, at least 2.25 wt. %, at least 2.5 wt. %, at least 2.75 wt. %, at least 3 wt. %, at least 3.25 wt. %, at least 3.5 wt. %, at least 3.75 wt. %, at least 4 wt. %, and at least 4.25 wt. %, based on the total solids of the strengthening admixture. Likewise, in any of the exemplary embodiments, the stabilizing agent may be included in an amount no greater than 12 wt. %, including an amount no greater than 10 wt. %, no greater than 8.5 wt. %, no greater than 8 wt. %, no greater than 7.5 wt. %, no greater than 7 wt. %, no greater than 5.5 wt. %, no greater than 5 wt. %, no greater than 4.8 wt. %, and no greater than 4.5 wt. %, based on the total solids of the strengthening admixture. In any of the exemplary embodiments, the stabilizing agent may be present in the strengthening admixture in an amount between about 0 wt. % to about 10 wt. %, including between about 0.1 wt. % and about 9.5 wt. %, between about 0.5 wt. % and about 9 wt. %, between about 0.75 wt. % and 8.5 wt. %, between about 1 wt. % and 8 wt. %, between about 1.25 wt. % and 7.5 wt. %, between about 1.5 wt. % and about 7 wt. %, between about 1.8 wt. % and about 6.5 wt. %, between about 2 wt. % and about 6 wt. %, and between about 2.25 wt. % and 5.5 wt. %. based on the total solids of the strengthening admixture, including all endpoints and ranges therebetween.

Without intention to limit the strengthening admixture, exemplary admixture compositional ranges are provided below, in Table 1. It is to be understood that the individual compositional ranges from any of Compositions A, B, and C in Table 1 may be combined with any other Composition and/or combination of ingredients and are not limited to the particular combination set forth in Table 1.

TABLE 1

| Ingredient | Composition A (wt. % solids) | Composition B (wt. % solids) | Composition C (wt. % solids) |
|---|---|---|---|
| Sodium Gluconate | 1-15 wt. % | 3-10 wt. % | 4-7 wt. % |
| Calcium Nitrate | 25-55 wt. % | 30-50 wt. % | 34-46 wt. % |
| Sodium thiocyanate | 10-30 wt. % | 12-25 wt. % | 14-20 wt. % |
| TEA | 1-10 wt. % | 2-8.5 wt. % | 3-6.5 wt. % |
| Diethanolamine-TEA | 3.5-17 wt. % | 5-15 wt. % | 7-12 wt. % |
| THEED | 5-30 wt. % | 8-25 wt. % | 10-20 wt. % |
| stabilizing agent | 0 to 10 wt. % | 1-8 wt. % | 2-6.5 wt. % |

The strengthening admixture may be present in a concrete mixture in an amount of at least 2 oz/100 lbs. cement, including an amount of at least 2.5 oz/100 lbs. cement, at least 3 oz/100 lbs. cement, at least 4 oz/100 lbs. cement, at least 5 oz/100 lbs. cement, at least 6 oz/100 lbs. cement, at least 7 oz/100 lbs. cement, at least 8 oz/100 lbs. cement, at least 9 oz/100 lbs. cement, at least 10 oz/100 lbs. cement, at least 10.5 oz/100 lbs. cement, at least 11 oz/100 lbs. cement, at least 11.5 oz/100 lbs. cement, and at least 12 oz/100 lbs. cement. Likewise, in any exemplary embodiment, the strengthening admixture may be present in a concrete mixture in an amount that is no greater than 30 oz/100 lbs. cement, including an amount no greater than 25 oz/100 lbs. cement, no greater than 22 oz/100 lbs. cement, no greater than 20 oz/100 lbs. cement, no greater than 18 oz/100 lbs. cement, no greater than 16.5 oz/100 lbs. cement, no greater than 16 oz/100 lbs. cement, no greater than 15.5 oz/100 lbs. cement, no greater than 15.0 oz/100 lbs. cement, no greater than 14.5 oz/100 lbs. cement, and no greater than 13 oz/100 lbs. cement, no greater than 12.5 oz/100 lbs. cement, and no greater than 12 oz/100 lbs. cement. In any of the exemplary embodiments, the strengthening admixture may be present in a concrete mixture in an amount that is between about 2 and about 30 oz/100 lbs. cement, including between about 3.5 and about 24 oz/100 lbs. cement, between about 4 and about 22 oz/100 lbs. cement, between about 6 and about 20 oz/100 lbs. cement, between about 8 and about 18 oz/100 lbs. cement, between about 9.5 and about 16 oz/100 lbs. cement, and between about 10 and about 14.5 oz/100 lbs. cement, including all endpoints and subranges therebetween.

The concrete for use in the concrete mixture may comprise any conventional cementitious material, such as, for example, hydraulic cement, Portland cement, modified Portland cement, Portland limestone cement, masonry cement, and mixtures thereof.

The concrete mixture further comprises an aggregate component and may include coarse aggregate, fine aggregate, or mixtures thereof. Aggregate material may comprise any conventional aggregate material, such as rock, mineral, recycled materials, synthetic materials, and the like. In any of the exemplary embodiments, the concrete mixture comprises a coarse aggregate, which may be defined as any particles having a size greater than 0.2 inch, but generally range between ⅜ and 1.5 inches in diameter, such as gravel, crushed stone (i.e., limestone). Alternatively, or in addition to, the concrete mixture comprises a fine aggregate, which generally consist of particles having a size smaller than 0.2 inches, such as sand and crushed stone.

The concrete mixture may further include supplementary cementitious materials, such as ground granulated blast furnace slag (GGBFS), fly ash, calcium carbonate, silica fume, calcined clays, metakaolin, and the like.

In any of the exemplary embodiments, the concrete mixture may further include one or more additional admixtures, such a high range water reducer (HRWR) admixture, which acts as a plasticizer and reduces water demand and allows for a lower water/cement ratio. In some exemplary embodiments, the HRWR is polycarboxylate-based, such as PLAS-TOL™ 6400 and 6420 by The Euclid Chemical Company, or polynaphthalene sulfonate-based.

The HRWR admixture may be present in a concrete mixture in an amount of at least 0.1 oz/100 lbs. cement, including an amount of at least 0.5 oz/100 lbs. cement, at least 0.75 oz/100 lbs. cement, at least 1 oz/100 lbs. cement, at least 1.5 oz/100 lbs. cement, at least 2 oz/100 lbs. cement, at least 2.25 oz/100 lbs. cement, at least 2.5 oz/100 lbs. cement, at least 2.7 oz/100 lbs. cement, at least 3 oz/100 lbs. cement, at least 3.5 oz/100 lbs. cement, at least 4 oz/100 lbs. cement, at least 4.5 oz/100 lbs. cement, and at least 4.75 oz/100 lbs. cement, and at least 5 oz/100 lbs. cement. Likewise, in any exemplary embodiment, the HRWR admixture may be present in a concrete mixture in an amount that is no greater than 20 oz/100 lbs. cement, including an amount no greater than 18 oz/100 lbs. cement, no greater than 15 oz/100 lbs. cement, no greater than 12 oz/100 lbs. cement, no greater than 10 oz/100 lbs. cement, no greater than 8.5 oz/100 lbs. cement, no greater than 8 oz/100 lbs. cement, no greater than 7.5 oz/100 lbs. cement, no greater than 7 oz/100 lbs. cement, no greater than 6.5 oz/100 lbs. cement, and no greater than 6 oz/100 lbs. cement, no greater than 5.5 oz/100 lbs. cement, and no greater than 5 oz/100 lbs. cement. In any of the exemplary embodiments, the strengthening admixture may be present in a concrete mixture in an amount that is between about 1 and about 15 oz/100 lbs. cement, including between about 2 and about 12 oz/100 lbs. cement, between about 3 and about 10 oz/100 lbs. cement, between about 3.5 and about 8 oz/100 lbs. cement, between about 4 and about 6 oz/100 lbs. cement, including all endpoints and subranges therebetween.

The concrete mixture described herein may contain other additives or ingredients and should not be limited to the stated or exemplary formulations. Further additives that may be included comprise, but are not limited to: retarders, accelerators, air-entraining or air detraining agents, plasticizers, corrosion inhibitors, pigments, damp proofing admixtures, water repelling admixtures, gas formers, permeability reducers, pumping aids, fungicidal admixtures, germicidal admixtures, insecticidal admixtures, fibers, alkali-reactivity reducer, bonding admixtures, shrinkage reducing admixtures, pigment and any other admixture or additive that does not adversely affect the properties of the admixture of the present invention.

It has particularly been discovered that including the strengthening admixture in a cementitious mixture within the above referenced dosage amounts results in a number of improvements over conventional cementitious mixtures. Particularly, the incorporation of the strengthening admixture enhances cement hydration, which enhances strength development and allows for sustainable and more energy efficient construction practices. Such sustainable and efficient practices come from the ability to reduce the amount of cement in a concrete mixture and increase the overall percentage of supplementary cementitious materials, without sacrificing strength, durability, and overall concrete quality. In any of the exemplary embodiments disclosed herein, incorporating about 10 oz/cwt of the strengthening admixture in a concrete mixture comprising water, aggregate, a high range water reducer (HRWR), and a reduced cement content (9% reduction) has been shown to produce a concrete product with a higher compressive strength in both the early (12 hour) and late (28 days) age development. In some exemplary embodiments, the a concrete mixture incorporating the strengthening admixture within the dosage amount provided herein demonstrates at least a 5% improvement in compressive strength, and in some exemplary embodiments, at least a 7% improvement, or at least a 10% improvement, or at least a 15% improvement, or at least an 18% improvement, or at least a 20% improvement in compressive strength, compared to an otherwise identical concrete mixture that does not include the subject admixture, or includes it in an amount outside of the dosage parameters provided herein.

The strengthening admixture is particularly effective when heat is present during the cure process, as it allows for earlier stripping of forms, the reuse of forms, and restoring the serviceability of concrete repairs. Further improvements provided by use of the strengthening admixture include allowing for the reduction in cement content, which lowers the $CO_2$ emissions, allowing for higher replacement levels of supplementary cementitious materials, and improving workability, finishing characteristics, and surface appearance of concrete products.

Having generally introduced the general inventive concepts by disclosing various exemplary embodiments thereof, a further understanding can be obtained by reference to certain specific examples illustrated below which are provided for purposes of illustration only and are not intended to be all inclusive or otherwise limiting of the general inventive concepts.

EXAMPLES

Example 1

Conventional concrete specimens were formed from a concrete mixture including 600 lbs./yd³ of Type I/II cement, 300 lbs./yd³ of water, 1800 lbs./yd³ of #57 top limestone aggregate, 1,406 lbs./yd³ of fine aggregate (ASTM C33), and 1.5 oz/cwt of a polycarboxy high range water reducing (HRWR) admixture (Plastol™ 6420) (hereinafter Comparative Example A). A second type of conventional concrete specimens were formed from a concrete mixture including 600 lbs./yd³ of Type IL cement, 300 lbs./yd³ of water, 1800 lbs./yd³ of #57 top limestone aggregate, 1,406 lbs./yd³ of fine aggregate (ASTM C33), and 1.5 oz/cwt of a polycarboxy high range water reducing (HRWR) admixture (Plastol™ 6420) (hereinafter Comparative Example B).

Exemplary concrete specimens were then formed by adding 10 oz/cwt of the strengthening admixture to Comparative Example B (hereinafter Sample 1). The strengthening admixture utilized in this example is provided below in Table 2.

TABLE 2

| (in wt. % solids) | |
| --- | --- |
| Water | |
| Sodium Gluconate | 5.02 |
| TEA | 5.59 |
| Sodium Thiocyanate Liquid | 17.9 |
| DEA | 10.67 |
| Calcium Nitrate | 37.65 |
| THEED | 18.65 |
| Acetic Acid | 4.48 |

The cement mixture was then used to form standard concrete blocks. Details of the compositions are provided below in Table 3 and illustrated in FIG. 1.

TABLE 3

| Compressive strength (psi) | Comparative Ex. A | Comparative Ex. B | Sample 1 | Percent Improvement over Comp. Ex. B |
| --- | --- | --- | --- | --- |
| 24 hour | 1,900 psi | 1,794 psi | 2,379 psi | 33% |
| 3 day | 3,817 psi | 3,619 psi | 4,215 psi | 16.5% |
| 7 day | 5,186 psi | 4,720 psi | 5,351 psi | 13.4% |
| 28 day | 7,173 psi | 6,614 psi | 7,261 psi | 9.8% |

As shown above in Table 3, incorporation of 10 oz/cwt of the strengthening admixture into a concrete mixture increases concrete compressive strength by at least 9% after 28 days of aging and by at least 33% after a 24-hour period.

Example 2

Conventional concrete specimens were formed from concrete mixture including 413 lbs./yd³ of Type I/II cement, 104 lbs./yd³ fly ash, 295 lbs./yd³ of water, 1800 lbs./yd³ of #57 top limestone aggregate, and 1,460 lbs./yd³ of fine aggregate (ASTM C33) (hereinafter Comparative Example C).

Figure 2:
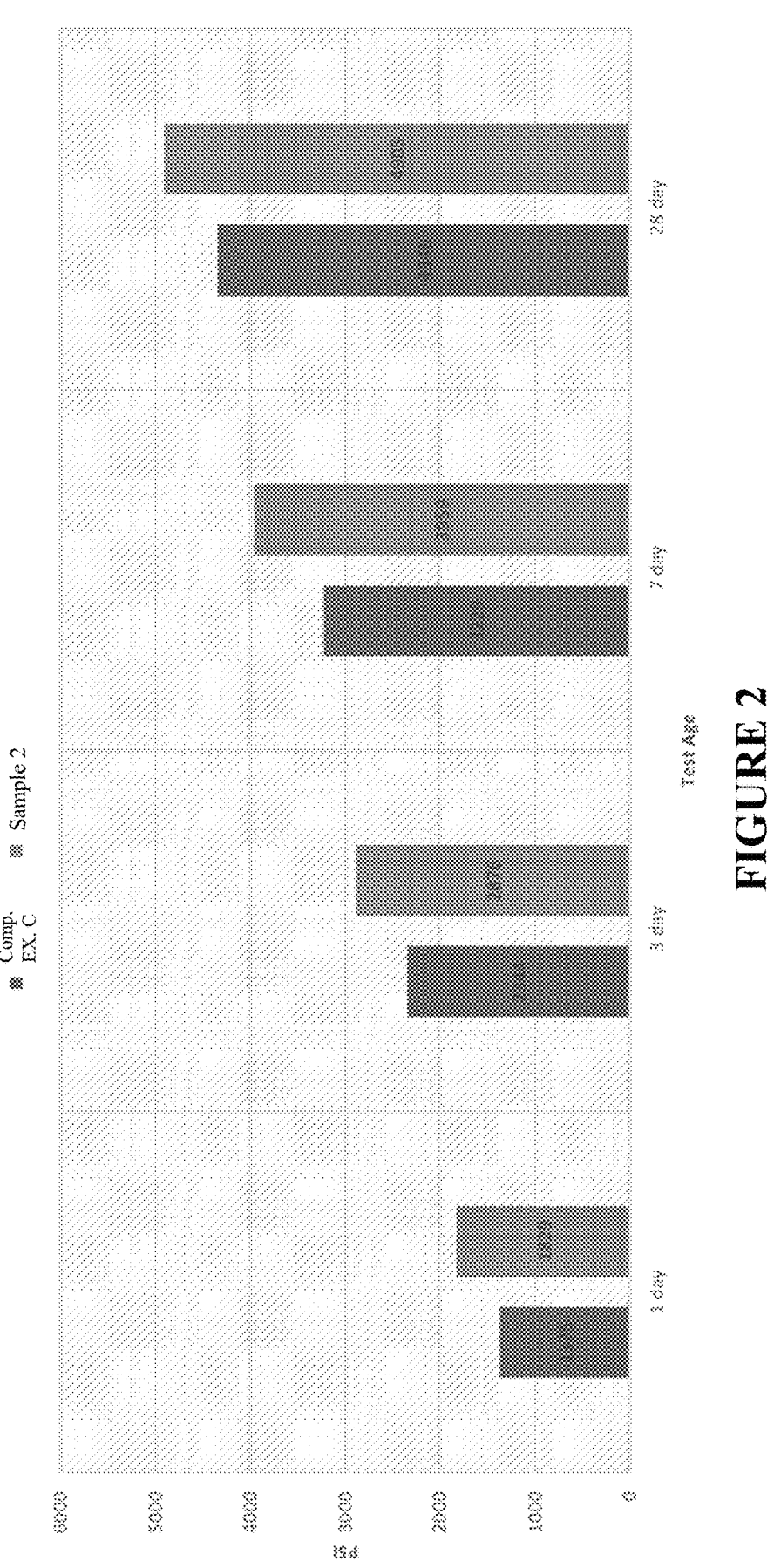
FIG. 2 graphically illustrates the compressive strength of concrete samples made with cement and fly ash with and without the inclusion of 4 oz/CWT of the strengthening concrete admixture disclosed herein.

An exemplary concrete mixture was then formed by adding 4 oz/cwt of the strengthening admixture (as defined in Table 6) to Comparative Example C (hereinafter Sample 2). The concrete mixture was then used to form standard concrete blocks. Details of the compositions are provided below in Table 4 and illustrated in FIG. 2.

TABLE 4

| Compressive strength (psi) | Comparative Ex. C | Sample 2 | Percent Improvement over Comp. Ex. C |
| --- | --- | --- | --- |
| 24-hour | 1,375 psi | 1,829 psi | 33% |
| 3-day | 2,344 psi | 2,876 psi | 22.7% |
| 7-day | 3,229 psi | 3,959 psi | 22.6% |
| 28-day | 4,346 psi | 4,905 psi | 12.9% |

As shown above in Table 4, incorporation of even 4 oz/cwt of the strengthening admixture into a concrete mixture increases concrete compressive strength by about 33% after a 24-hour period and continues to demonstrate an increased strength over a 28-day aging period.

Example 3

Conventional concrete specimens were formed from concrete mixtures including 850 lbs./yd³ of Type I/II cement, 325 lbs./yd³ of water, 1450 lbs./yd³ of ½" top limestone aggregate, 1416 lbs./yd³ of fine aggregate sand, and 5 oz/cwt of a polycarboxy high range water reducing (HRWR) admixture (Plastol™ 6400) (hereinafter Comparative Example D). Exemplary concrete specimens were then formed from a concrete mixture comprising: 775 lbs./yd³ of Type I/II cement, 295 lbs./yd³ of water, 1515 lbs./yd³ of ½" top limestone aggregate, 1495 lbs./yd³ of fine aggregate sand, 5 oz/cwt of a polycarboxylate high range water reducing (HRWR) admixture (Plastol™ 6400), and 10 oz/cwt of the strengthening admixture (hereinafter Sample 3). The strengthening admixture utilized in this example is provided below in Table 5.

TABLE 5

| Ingredient Water | Weight Active |
| --- | --- |
| Sodium Gluconate (70%) | 5.8 wt. % |
| Calcium Nitrate (70%) | 44.3 wt. % |
| Sodium thiocyanate (50%) | 16.7 wt. % |
| TEA (78%) | 5.2 wt. % |
| Diethanolamine (85%) | 9.9 wt % |
| THEED (80%) | 17.3 wt % |
| Tylose H-300 (100%) | 0.8 wt. % |

Figure 3:
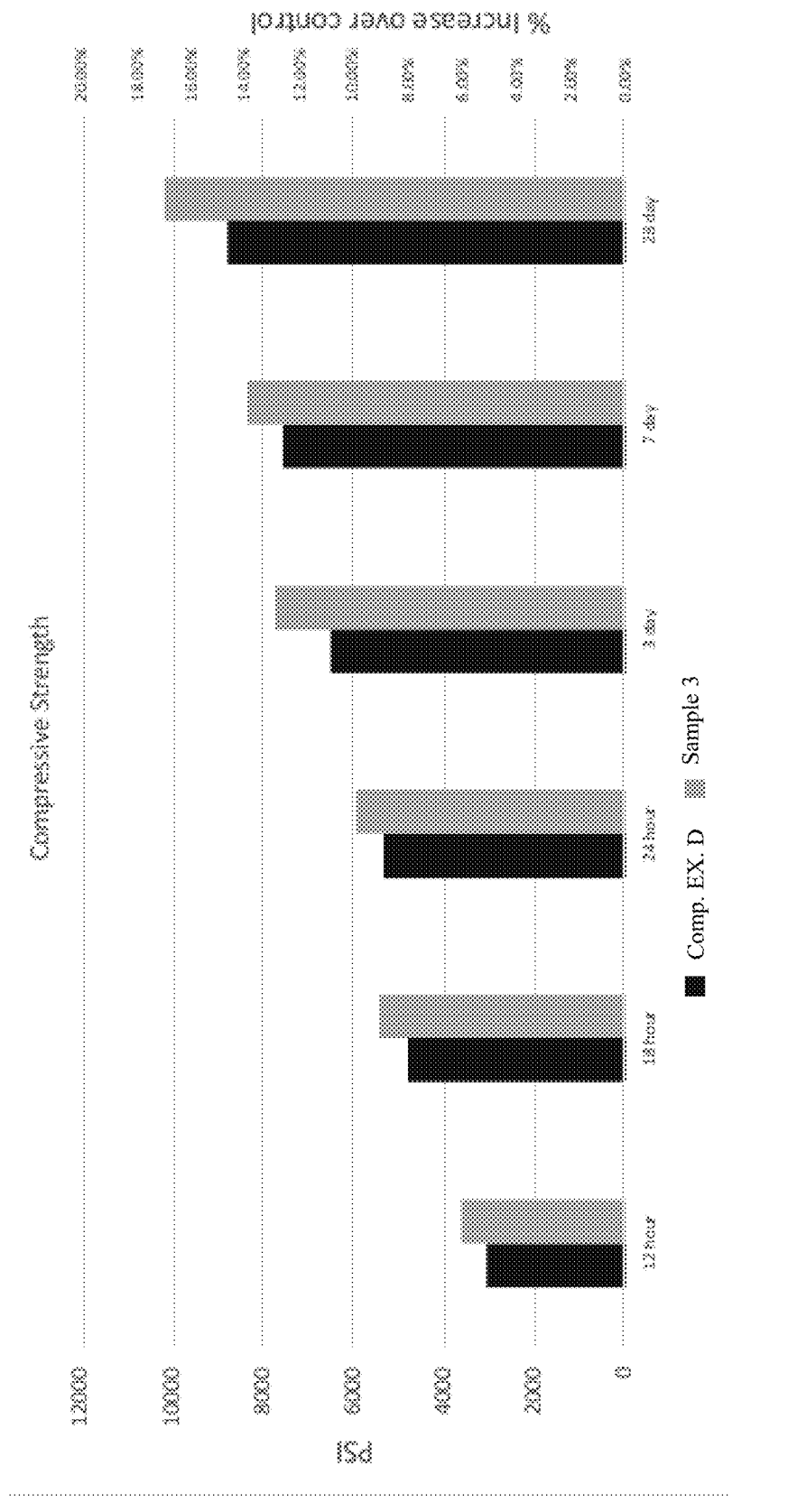
FIG. 3 graphically illustrates the compressive strength of concrete samples made with cement and 5 oz/cwt of a polycarboxy high range water reducing admixture with and without the inclusion of 10 oz/CWT of the strengthening concrete admixture disclosed herein.

The concrete mixtures were then used to form standard concrete specimens. Details of the compositions are provided below in Table 6 and illustrated in FIG. 3.

TABLE 6

| | Comparative Ex. D | Sample 3 |
| --- | --- | --- |
| Total cement (lbs./yd³) | 850 | 775 |
| Water (lbs./yd³) | 325 | 295 |
| 1/2" limestone (coarse aggregate) (lbs./yd³) | 1450 | 1515 |
| Sand (fine aggregate) (lbs./yd³) | 1416 | 1495 |
| Ratio fine aggregate to coarse | 0.51 | 0.51 |
| HRWR | 5.0 oz/cwt | 5.0 oz/cwt |
| Strengthening Admixture | 0 | 10 oz/cwt |

| Compressive strength (psi) | | | Percent Improvement |
| --- | --- | --- | --- |
| 12 hour | ~3000 psi | ~3700 psi | ~23% |
| 18 hour | ~4,700 psi | ~5,600 psi | ~19% |
| 24 hour | ~5,600 psi | ~5,990 psi | ~7% |
| 3 day | ~6,200 psi | ~7,700 psi | ~24% |
| 7 day | ~7,500 psi | ~8,200 psi | ~9% |
| 28 day | ~8,800 psi | ~10,100 psi | ~15% |

As shown above in Table 6, incorporation of the strengthening admixture into the concrete mixture allows for a reduction in cementitious material (900 reduction), while increasing concrete compressive strength through early (12 hour) and late (28 day) age development. The improvement in compressive strength with a reduced cement content was an unexpected benefit of using the strengthening admixture.

Unless otherwise defined, all technical and scientific terms used herein have the same meaning as commonly understood by one of ordinary skill in the art to which this application pertains. Although other methods and materials similar or equivalent to those described herein may be used in the practice or testing of the exemplary embodiments, exemplary suitable methods and materials are described below. In case of conflict, the present specification including definitions will control. In addition, the materials, methods, and examples are illustrative only and not intended to be limiting of the general inventive concepts.

The terminology as set forth herein is for description of the exemplary embodiments only and should not be construed as limiting the application as a whole. Unless otherwise specified, "a," "an," "the," and "at least one" are used interchangeably. Furthermore, as used in the description of the application and the appended claims, the singular forms "a," "an," and "the" are inclusive of their plural forms, unless contradicted by the context surrounding such.

Unless otherwise indicated, all numbers expressing quantities used in the specification and claims are to be understood as being modified in all instances by the term "about." The term "about" means within +/−10% of a value, or in some instances, within +/−5% of a value, and in some instances within +/−1% of a value.

To the extent that the term "includes" or "including" is used in the description or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." Thus, use of the term "or" herein is the inclusive, and not the exclusive use.

Unless otherwise indicated, any element, property, feature, or combination of elements, properties, and features, may be used in any embodiment disclosed herein, regardless of whether the element, property, feature, or combination of elements, properties, and features was explicitly disclosed in the embodiment. It will be readily understood that features described in relation to any particular aspect described herein may be applicable to other aspects described herein provided the features are compatible with that aspect.

Every numerical range given throughout this specification and claims will include every narrower numerical range that falls within such broader numerical range, as if such narrower numerical ranges were all expressly written herein.

The scope of the general inventive concepts presented herein are not intended to be limited to the particular exemplary embodiments shown and described herein. From the disclosure given, those skilled in the art will not only understand the general inventive concepts and their attendant advantages but will also find apparent various changes and modifications to the devices, systems, and methods disclosed. It is sought, therefore, to cover all such changes and modifications as fall within the spirit and scope of the general inventive concepts, as described and/or claimed herein, and any equivalents thereof.

The invention claimed is:

1. A strengthening concrete admixture for the production of high-strength concrete products comprising:
   water;
   1 wt. % to 15 wt. % of a set retarder comprising a salt of gluconic acid;
   one or more set accelerators comprising an inorganic salt, a salt of thiocyanic acid, or mixtures thereof;

0.5 wt. % to 25 wt. % of one or more hardening accelerators comprising one or more of an alkanolamine and an ethylene amine; and 0.1 wt. % to 10 wt. % of at least one stabilizing agent comprising a carboxylic acid, based on a total solids content in the strengthening concrete admixture, wherein the set retarder, set accelerator(s), hardening accelerator(s), and stabilizing agent(s) are each chemically distinct.

2. The strengthening concrete admixture of claim 1, wherein the set retarder is present in an amount between 3 wt. % and 10 wt. %, based on a total solids content of the strengthening admixture.

3. The strengthening concrete admixture of claim 1, wherein the set accelerator comprises each of an inorganic salt and a salt or ester of thiocyanic acid.

4. The strengthening concrete admixture of claim 1, wherein the inorganic salt comprises calcium nitrate or sodium nitrate.

5. The strengthening concrete admixture of claim 1, wherein the inorganic salt is present in the admixture in an amount between 25 wt. % and 55 wt. %, based on a total solids content of the strengthening admixture.

6. The strengthening concrete admixture of claim 1, wherein the inorganic salt is present in the admixture in an amount between 34 wt. % and 46 wt. %, based on a total solids content of the strengthening admixture.

7. The strengthening concrete admixture of claim 1, wherein the salt of thiocyanic acid is one or more of sodium thiocyanate, potassium thiocyanate, magnesium thiocyanate, calcium thiocyanate, and ammonium thiocyanate.

8. The strengthening concrete admixture of claim 1, wherein the salt of thiocyanic acid is present in the admixture in an amount between 10 wt. % and 30 wt. %, based on a total solids content of the strengthening admixture.

9. The strengthening concrete admixture of claim 1, wherein the hardening accelerator comprises one or more alkanolamines and one or more ethylene amines.

10. The strengthening concrete admixture of claim 9, wherein the one or more alkanolamines include triethanolamine, diethanolamine, and mixtures thereof.

11. The strengthening concrete admixture of claim 10, wherein triethanolamine is included in the strengthening admixture in an amount between 1 wt. % and 10 wt. %, based on a total solids content of the strengthening admixture.

12. The strengthening concrete admixture of claim 10, wherein triethanolamine is included in the strengthening admixture in an amount between 3 wt. % to 6.5 wt. %, based on a total solids content of the strengthening admixture.

13. The strengthening concrete admixture of claim 10, wherein diethanolamine is included in the strengthening admixture in an amount between 3.5 wt. % and 20 wt. %, based on a total solids content of the strengthening admixture.

14. The strengthening concrete admixture of claim 9, wherein one or more ethylene amine is included in the strengthening admixture in an amount between 5 wt. % and 30 wt. %, based on a total solids content of the strengthening admixture.

15. The strengthening concrete admixture of claim 1, wherein the stabilizing agent comprises carboxylic acid in an amount 0.5 wt. % and 8 wt. %, based on a total solids content of the strengthening admixture.

16. The strengthening concrete admixture of claim 1, wherein the admixture comprises:

| | |
|---|---|
| Sodium Gluconate: | 2.0-10 wt. %; |
| Calcium Nitrate: | 30-50 wt. %; |
| Sodium thiocyanate: | 10-30 wt. %; |
| Triethanolamine | 1-10 wt. %; |
| Diethanolamine/triethanolamine blend | 3.5-20 wt. %; |
| Tetrahyroxyethyl ethylene diamine | 8-25 wt. %; and |
| Acetic acid | 1 to 8 wt. %. |

17. A concrete mixture, comprising:

cement;

aggregate: and 3.5 oz/100 lbs. cement to 24 oz/100 lbs. cement of a strengthening admixture comprising:

water;

1 wt. % to 15 wt. % of a set retarder comprising a salt of gluconic acid;

one or more set accelerators comprising an inorganic salt, a salt of thiocyanic acid, or mixtures thereof;

0.5 wt. % to 25 wt. % of one or more hardening accelerators comprising one or more of an alkanolamine and an ethylene amine; and 0.1 wt. % to 10 wt. % of at least one stabilizing agent comprising a carboxylic acid, based on a total solids content in the strengthening concrete admixture, wherein the set retarder, set accelerator(s), hardening accelerator(s), and stabilizing agent(s) are each chemically distinct.

18. The concrete mixture of claim 17, wherein said strengthening admixture is present in the concrete mixture in an amount from about from 5 oz/100 lbs. cement to about 15 oz/100 lbs. of cement.

19. The concrete mixture of claim 17, further including a polycarboxylate-based high range water reducer admixture.

20. The concrete mixture of claim 17, wherein the stabilizing agent comprises acetic acid.

* * * * *